United States Patent [19]

Hartman et al.

[11] Patent Number: 4,586,688
[45] Date of Patent: May 6, 1986

[54] FISHING ROD HOLDER

[75] Inventors: John E. Hartman; Roger Petrovich, both of Painesville; Frank Bortnick, Euclid, all of Ohio

[73] Assignee: F.J.R. Industries, Inc., Painesville, Ohio

[21] Appl. No.: 602,350

[22] Filed: Apr. 20, 1984

[51] Int. Cl.⁴ .............................................. A01K 97/10
[52] U.S. Cl. .................................... 248/538; 43/21.2; 248/223.1
[58] Field of Search ............... 248/534, 538, 535, 536, 248/540, 223.1; 43/21.2

[56] References Cited

U.S. PATENT DOCUMENTS

| | | | |
|---|---|---|---|
| 2,442,357 | 6/1948 | Hamman | 248/535 X |
| 2,626,770 | 1/1953 | Norman | 248/534 |
| 2,840,330 | 6/1958 | Minton | 248/41 |
| 2,890,847 | 6/1959 | Minton et al. | 248/534 |
| 3,193,228 | 7/1965 | Chion | 248/538 X |
| 3,246,865 | 4/1966 | Latimer | 248/540 X |
| 3,559,940 | 2/1971 | Kruzell | 248/223.1 X |
| 3,792,829 | 2/1974 | Fickett | 248/534 |
| 4,284,172 | 8/1981 | Cohen | 182/204 |

Primary Examiner—J. Franklin Foss
Assistant Examiner—David L. Talbott
Attorney, Agent, or Firm—Renner, Otto, Boisselle & Lyon

[57] ABSTRACT

Apparatus for supporting a fishing rod, includes receptacle and cover members pivotably connected to each other and movable about a pivot axis between open and closed positions, the two members when in an open relation being adapted to receive a portion of a fishing rod therebetween, and the two members when in a closed relation cooperating to define a housing circumscribing at least part of the contained portion of a fishing rod while supporting the fishing rod in a rest position with the axis thereof generally parallel to such pivot axis, and the two members being cooperative to engage with a part of the fishing rod to resist pivoting movement toward an open position in response to forces in the fishing rod tending to tilt the same on an angle with respect to such pivot axis, and an opening device or portion responsive to force applied by such fishing rod to the cover member in a direction generally perpendicular to such pivot axis to open the members to permit removing such fishing rod. Features of the invention include a unique secure interference fit of multiple parts of the invention for increasing strength thereof and facilitating use of molded plastic parts, a unique slide-lock to permit insertion and removal of the receptacle and cover members with respect to a support base, and a rotatability feature that both securely retains the receptacle and cover members in a support base while also facilitating expeditious and secure insertion and removal of the receptacle and cover members with respect to the base.

10 Claims, 8 Drawing Figures

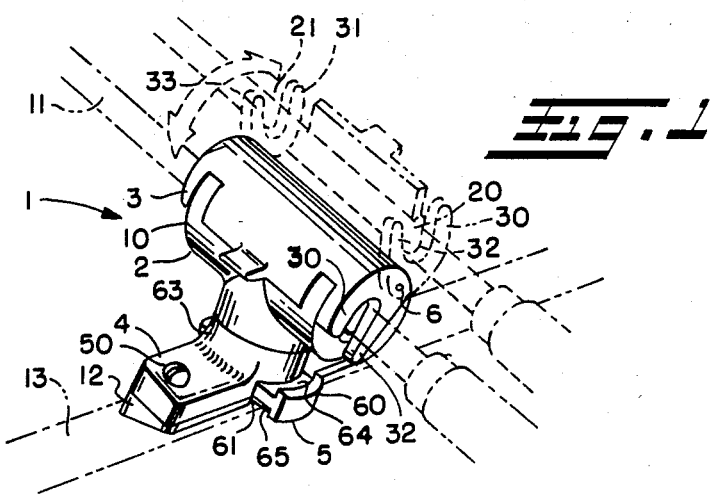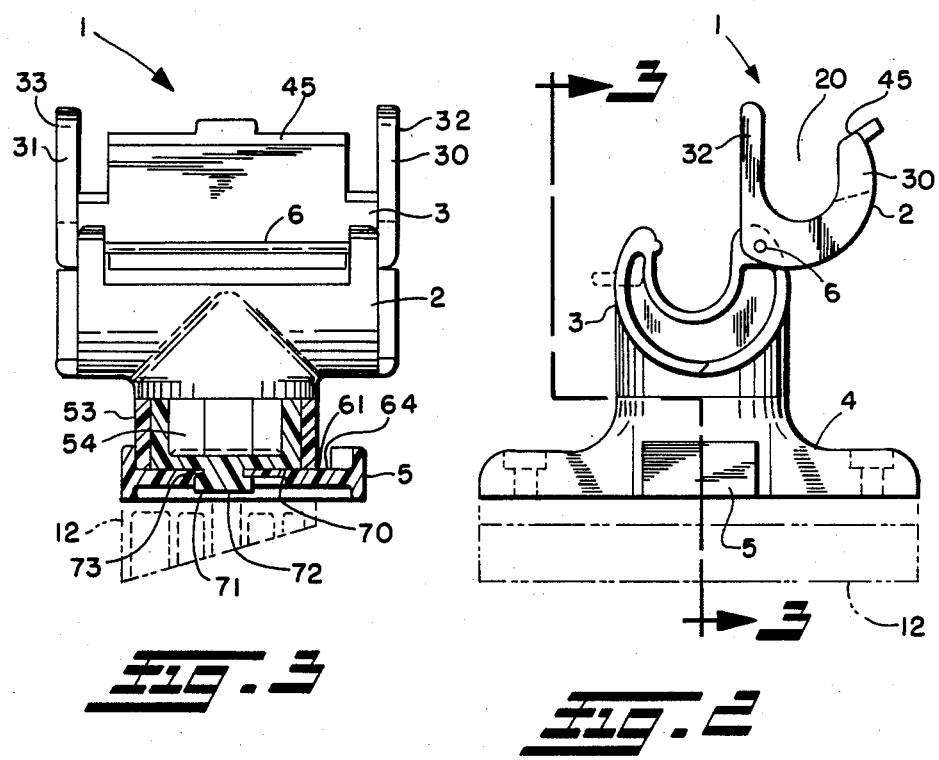

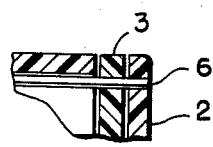
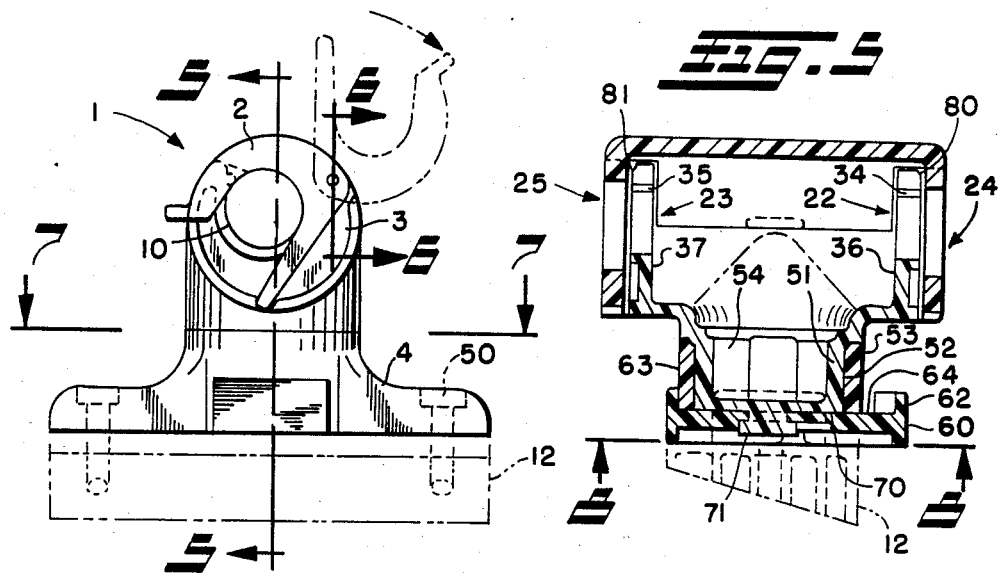
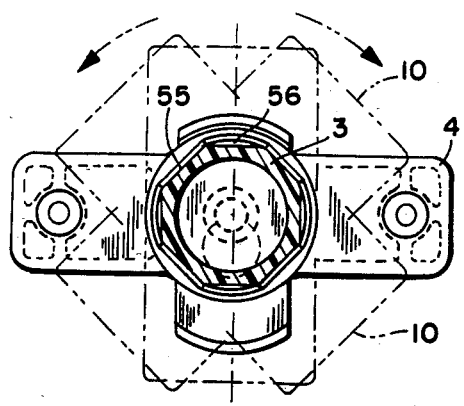
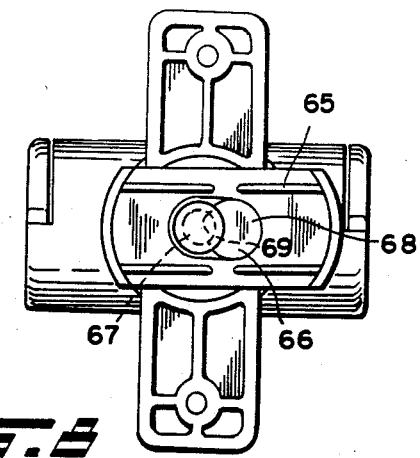

1

FISHING ROD HOLDER

TECHNICAL FIELD

This invention relates generally, as indicated, to rod holders, and, more particularly, to a selectively releasable fishing rod holder capable of facile use, orientation and installation.

BACKGROUND

During fishing, there are times when a fisherman may wish to put down the fishing rod, for example, when it is desired to check the radio gear, to get some food, simply to relax, etc. At these times, it may be undesirable or in any event usually unnecessary to reel in the hook and bait; yet to allow the same to remain in the water, a fish may bite and pull the rod and reel right off the boat, for example. It would be desirable to have a convenient means to hold the rod during such occasions. Other such occasions when it may be desirable to have a mechanical means to hold the fishing rod may be while trawling and when one fisherman may be fishing with more than one fishing rod.

SUMMARY

The present invention provides a convenient holder for fishing rods. The holder may be used easily; using one hand the fishing rod may be inserted into the holder, and using one hand and an upward motion the fishing rod can be removed expeditiously. Yet, the fishing rod holder securely holds a fishing rod therein against the force of a downward or outward pulling fish or against excess torque tending to rotate the rod; the holder retains the fishing rod therein against angular rotations of the rod.

A number of significant features of the invention include strength, corrosion resistance, and avoidance of scratching or marring even delicate fishing rods, such as graphite and boron fishing rods. Moreover, the holder can be conveniently selectively rotated to locate the fishing rod in a desired position. Rotation permits optimum operation of the holder by both left-handed or right-handed fishermen. A snap lock that can be operated with great facility enables prompt locking of the holder and rod in a given position or the freeing of the holder for rotation to another position or for removal from a support base. Moreover, the support base is of low profile to enable covering of the same by a conventional boat cover without damaging or stretching the cover.

According to one aspect of the invention, then, an apparatus for supporting a fishing rod includes a receptacle and cover members pivotally connected to each other and movable about a pivot axis between open and closed positions, the two members when in an open relation being adapted to receive a portion of a fishing rod therebetween, and the two members when in a closed relation cooperating to define a housing circumscribing at least part of the contained portion of a fishing rod while supporting the fishing rod in a rest position with the axis thereof generally parallel to such pivot axis, the two members being cooperative to engage with a part of the fishing rod to resist pivoting movement toward an open position in response to forces in the fishing rod tending to tilt the same on an angle with respect to such pivot axis, an opening device or portion responsive to force applied by the fishing rod to the cover member in the direction generally perpendicular to the pivot axis to open the members to permit removing of the fishing rod, a mounting device for mounting the receptacle and cover members for use to hold the fishing rod, and a slide lock device for selectively sliding between an open position to permit removal of the receptacle and cover members from the mounting device and a locked position to lock the receptacle and cover members in the mounting device.

According to another aspect of the invention, such combination of the receptacle and cover members also includes a mounting base for substantially securely mounting the receptacle and cover members on the surface, the mounting base including an opening in a top portion thereof to receive a male support portion of the receptacle member to hold the same securely therein without permitting rotation thereof; and a further aspect includes the provision of cooperative surfaces in such base opening and on such receptacle male support to permit relatively fixed positioning thereof in a plurality of selected different relatively rotated orientations.

According to still another aspect of the invention, the combination of receptacle and cover members is formed of plastic material that is injection molded.

The foregoing and other objects, features, advantages and aspects of the invention will become more apparent as the following description proceeds with reference to the accompanying drawing.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is an isometric view of a fishing rod holder according to the invention;

FIG. 2 is an end elevation view of the fishing rod holder with the cover member shown in position just prior to closure to engage the end walls of the receptacle member;

FIG. 3 is a front elevation view looking generally in the direction of the arrows 3—3 of FIG. 2;

FIG. 4 is an end view of the fishing rod holder;

FIG. 5 is a section view of the fishing rod holder looking generally in the direction of the arrows 5—5 of FIG. 4;

FIG. 6 is a fragmentary section view of the pivot pin connection of the receptacle and cover members for the fishing rod holder looking generally in the direction of the arrows 6—6 of FIG. 2;

FIG. 7 is a partial section view looking down at the base of the fishing rod holder with the receptacle and cover members in respective relatively rotated positions, the section being taken generally along the lines 7—7 of FIG. 4; and FIG. 8 is a bottom view of the fishing rod holder looking generally in the direction of the arrows 8—8 of FIG. 5.

DESCRIPTION OF THE PREFERRED EMBODIMENT

Referring, now, in detail to the drawings, wherein like reference numerals designate like parts in the several figures, and initially to FIGS. 1-6, a fishing rod holder in accordance with the present invention generally is indicated at 1. The holder 1 is formed of receptacle and cover members 2, 3, a main support base 4, and a slide lock 5. A pivot pin 6 that preferably extends linearly through the entire holder 1 defines a pivot axis and couples the receptacle and cover to permit the cover to rotate about the pivot axis selectively to open and close the holder 1. The receptacle 2 and cover 3 define a generally cylindrical housing generally designated 10 for retaining therein a fishing rod shown at 11 in phantom outline. The holder 1 also may include a shim base 12 to alter the mounting angle of the holder.

As it is seen in FIG. 1, for example, the fishing rod holder 1 is intended to be mounted in a general horizontally orientation, i.e., the pivot axis defined by the pivot pin 6 extending generally in a horizontal direction or, alternatively, at a slight angle with respect to horizontal. Such angle may be defined by the shim base 12 as is seen in FIG. 1, in the event the support surface 13 is close to horizontal. The support surface may be, for example, the top side wall of a boat, such as the gunwale, may be another part of a boat or may be another support surface, whether or not on or part of the boat. It is the object of the fishing rod holder 1 to hold securely therein a fishing rod 11, to enable the fishing rod conventiently to be placed in the holder and to facilitate expeditious removal of the rod 11 when desired by a fisherman.

As is illustrated in FIG. 1 in phantom outline, a fisherman may place a fishing rod 11 into the slots 20, 21 in the cover member 3 while the same is pivoted to an open position. Thereafter, with the fishing rod so positioned in the cover member 3, the latter may be rotated counterclockwise relative to the illustration of FIG. 1 about the axis of the pivot pin 6 until the cover 3 comes to the full-closed position or orientation shown in solid lines in FIG. 1. During such rotation of the cover 3, the fishing rod 11 also enters slots 22, 23 in the receptacle 2. On full closure of the cover 3, the slots 20-23 define respective openings 24, 25 in the housing 10 through which the fishing rod 11 passes while the holder 1 ordinarily retains the fishing rod therein as will be described in greater detail below.

Each of the receptacle 2 and cover 3 generally forms a half cylinder, which when closed to the position shown in FIG. 1, for example, complete the cylindrical housing 10. The slots 20, 21 are formed in end walls 30, 31 of the cover 3 and are bounded generally by straight side walls and a curved bottom with an open end. One of the straight side walls is formed by a respective cam arm 32, 33.

The slots 22, 23 in the receptacle 2 are generally U-shape having a curved bottom and generally straight side walls. Near the top of one side wall is an opening through which the pivot pin 6 passes, and near the top of the opposite side wall of the slots 22, 23 are respective protuberances 34, 35 which face inwardly in the respective slot for the opposite wall defining the slot. The protuberances 34, 35 effectively narrow the width of the slots 22, 23 to facilitate secure holding of a thin rod. The protuberances 34, 35 may be filed or clipped off for wider rods.

The curved portion of each of the slots 20-23 facilitates supporting or confrontation with the fishing rod without damaging the same, and this is all the more true in view of the relatively wide surface areas, specifically the thicknesses of the end walls 30, 31 of the cover and 36, 37 of the receptacle. That the various parts, mainly the receptacle 2 and cover 3, are made of plastic material, as opposed to less desirable metal, further contributes to the ability to use the holder 1 without scratching, marring, or otherwise damaging the fishing rod 11.

The slots 20, 21 are of such size and configuration and are mounted for rotation with the cover 3 about the pivot pin 6 such that with the fishing rod 11 fully in such slots, during closure of the cover over the receptacle 2, the fishing rod also smoothly enters the open tops of the slots 22, 23 and comes to rest at the curved bottoms of those slots 22, 23. With the cover 2 closed to the position shown in FIG. 4, for example, the cam arms 32, 33 have surfaces aligned parallel and in a sense past and under center of the curved bottoms of the receptacle slots 22, 23. Therefore, when a downward force is applied to the end of the rod 11 (FIG. 1), for example, by a fish pulling on the fishing line which is held by an eye to the end of the rod 11, such downward force tends to prevent the cam arm 33 (as it is seen in FIG. 1) from lifting up, whereas such downward force on such end of the rod where the line leaves the same tends to pivot the reel or handle end of the rod upward. Such upward movement of the reel end of the rod tends to try to open the cover 3. Since the downward pulling force acts on the cam arm 33 through a larger lever arm than effectively does the upward moving force acting on the side wall of slot 20 opposite cam arm 32 (the downward moving force having the length of the rod extending beyond the holder 1 through which to act whereas the upward moving force has only the axial dimension of the holder 1 to act through, using the abutment of the rod with the bottom of the slot 33 (as seen in FIGS. 1 and 3) as the fulcrum), the cover 3 will not open and release the rod. Similar holder operation to retain a rod in response to a force at the handle end tending to tilt the same down and the distal end up also would occur in the invention. The invention, then, may be understood to operate to retain in the holder an elongate device even when differential force occurs tending to tilt the elongate device off a parallel relation with the pivot axis of pivot pin 6.

However, when a fisherman decides to move the fishing rod from the holder 1, an upward movement while maintaining the rod 11 generally parallel to the pivot axis of the pivot pin 6, will easily open the cover 3 and release the rod.

A right-handed fisherman would grab the handle 40 of the rod 11 on release and would tend to move the rod toward the left as is seen in FIG. 3 at the same time upward movement is effected; this is referred to as a right-handed mounting of the fishing rod holder 1. As is seen in FIG. 2, such upward and leftward movement would result in the rod escaping the slots 22, 23 and subsequently the slots 20, 21 as early as possible without having to wait for the slots 20, 21 to reach vertical open position (FIG. 1 in phantom outline). The protuberances 34, 35 tend to cooperate with the rod to resist removal thereof until a certain snap action occurs to remove the same from a holder 1. The protuberances 34, 35 tend to interfere with simple rod removal. Moreover, the protuberances 34, 35 may be so dimensioned to facilitate snapping or otherwise retaining the rod in the slots 22, 23 while the cover 3 is in full open position. Moreover, while the cover is in such full openm position, it will be appreciated, as is seen in FIG. 1, that a second fishing rod could be supported therein.

The main support base 4 can be secured, for example by screws 50, to the top of the gunwale or support surface 13 and the receptacle 2 and cover 3 of the fishing rod holder 1 may be attached to or removed from the main support base 4. When the receptacle and cover are removed from the main support base 4, the latter has a relatively low profile and easily can be covered by a conventional boat cover or the like.

For use the receptacle 2 and cover 3 are installed in the main support base 4 by inserting a supporting extension 51 of the receptacle 2 into a mating opening 52 formed in the upstanding wall 53 of the main support base 4. The supporting extension 51 has a plurality of surface flats 54 peripherally about the axis (a vertical line, not shown, in FIG. 3) and in the preferred embodiment and best mode of the invention, the supporting extension 51 has an octagonal periphery formed by eight generally equal size surface flats 54 about the axis thereof. The wall 53 bounding the opening 52 in the main support base 4 also has a plurality of flat surfaces 55 for mating generally in relatively close fitting surface-to-surface abutment relation with the respective surface flats 54. The arrangement of surfaces 55 permits the receptacle 2 and cover 3 to be positioned in the main support base 4 and any one of eight different positions that are oriented at approximately 45° rotation with respect to each adjacent position. In this way the holder 1 may be used in the manner shown in FIG. 1 extending perpendicularly or outward from the boat for right-handed operation, as was described above. Alternatively, the receptacle 2 and cover 3 may be rotated 180° relative to the main support base for left-handed operation. The receptacle 2 and cover 3 likewise may be rotated to hold the fishing rod 11 at approximately a 45° angle with respect to the line of the boat or to allow the fishing rod to extend parallel to the line of the boat.

When the cover is rotated to full open position, the tendency of a fisherman would be to move the fishing rod not only vertically up but also to its side. If the tendency were to move the same to the right, then the fishing rod would tend to ride up along the right-hand side (as seen in FIGS. 1 and 2) of the cover slots 20, 21 and would be guided by the sloped surfaces 45 off to the right out of the way of the fishing rod holder 1. Left-hand operation would be opposite that for right-handed operation.

In the preferred embodiment and best mode of the invention, the supporting extension 51 includes eight surface flats 54. On the other hand, the wall 53 forming the opening 52 has only four surface flats 55 therein and four slightly curved surfaces 56. A respective curved surface 56 separates each otherwise relatively adjacent flat surfaces 55. The curved surfaces 56 reduce the effective tolerances required to permit facile insertion of the supporting extension 51 into the opening 52 by providing small clearance between the wall 53 bounding the opening 52 and the surface flats 54 which confront the curved wall areas 56. Smooth, easy insertion of the supporting extension 51 into the main support base 4 is enabled, accordingly, thus facilitating installation of the receptacle into the main base 4, even while the boat is rocking vigorously, for example.

The slide lock 5 includes a slide 60 which slides within and is retained within a recess 61 in the bottom of the support base 4. The slide 60 has a pair of opposite stop surfaces 62, 63 that limit sliding travel thereof and a lock surface or wall 64. One or more spacer walls or ribs 65 at the bottom of the slide lock surface 64 are of a length so as to be generally coplanar with the bottom of the main support base 4 while urging the top surface of the lock surface 64 generally into engagement with the underside of the main support base 4 within the recess 61. Formed in the lock surface 64 is an opening 66 including a pair of relatively circular portions 67, 68, adjacent borders of which are separated by protruding lock points 69. Depending downwardly from the bottom 70 of the supporting extension 51 of the receptacle 2 is a lock tab 71 having a relatively wide head 73 at the distal end and a relatively narrower neck 73 between the head and the bottom wall 70.

The diameter of the head 72 is slightly smaller than the diameter of the opening 66 in the slide 60 so that such head may be inserted into the opening 66 or withdrawn therefrom during usual insertion or removal of the receptacle 2 and cover 3 with respect to the main support base 4. During such insertion or removal the slide 60 would be moved to a position aligning the opening 68 with the lock tab 71. However, with the lock tab 71 protruding through the opening 68, when the receptacle 2 and cover 3 are fully inserted with respect to the main support base 4, the slide 60 may be moved to the illustrated right-hand position shown in FIG. 8. On such sliding movement, the locking points 69 slightly resiliently deform to pass about the neck 73 of the lock tab 71, and then the lock tab neck is securely retained in the lock opening 67, while the head 72 protrudes below the slide lock surface 64, thus preventing withdrawal of the receptacle 2 and cover 3 from the main support base 4. Importantly, while the holder receptacle and cover are removed from the main support base 4, the slide 60 remains in place without affecting the low profile of the base 4 and is ready for use whenever the receptacle and cover are reinstalled in the base 4.

Secure fitting together of the several parts of the fishing rod holder 1 is an important aspect of the invention. Such close fitting tolerances especially is advantageous when using molded plastic parts because the secure interfit helps one part give further strength to another part that is in abutting confrontation therewith. Thus, the close fit of several parts of the invention helps to strengthen the same. Moreover, an advantage of the invention over prior metal fishing rod holders is that the plastic material tends to be kind to the material of which the fishing rod itself is made thereby avoiding marring, scratching or otherwise detrimentally affecting the fishing rod. Plastic parts also are not subject to the corrosion problems of metal.

Consistent with the close fit tolerances of the invention, the cam arms 30, 31 are spaced with respect to the end walls 36, 37 of the receptacle so as to interfere and to abut with surfaces of such end walls during closure of the cover 3. Chamfered surfaces 80, 81 at the upper ends of the walls 36, 37 help to guide such cam arms 32, 33 into such abutting and sliding engagement with the end wall surfaces. Such confrontation both strengthens the fishing rod holder 1 and helps minimize free play between the receptacle 2 and cover 3 during use of the fishing rod holder 1, especially helping to secure the same in closed position when downward force is applied by a fish pulling on the fishing line and also to resist too free opening of the cover member.

Desirably the fishing rod holder 1 is mounted with the linear axis of the cylindrical axis 10, which is parallel with the axis of the pivot pin 6, in a horizontal position. If desired, the shim base 12 may be mounted beneath the main support base 50 in the manner illustrated in FIG. 1 and as also is shown in FIGS. 2-5, to orient the fishing rod holder in a direction raising the distal end of the fishing rod above the handle end. However, the shim base also may be used to mount the fishing rod holder on an angle to the support, thus placing the main support base in a horizontal plane.

Using the fishing rod holder according to the invention, then, the receptacle 2 and cover 3 are installed in the main support base 4, which is mounted on a support surface 13, and the slide lock 5 is slid to lock the receptacle and cover to the main support base. Thereafter, the cover may be opened. A fishing rod 11 may be inserted into the slots 20, 21 of the cover, and the cover then is rotated to closed position. When force is applied at the distal end of the fishing rod tending to pivot the same in the downward direction, the fishing rod holder still will hold the fishing rod securely. However, when a fisherman wishes to remove the fishing rod from the holder 1, vertical movement while maintaining the fishing rod generally parallel with the axis of the pivot pin 6 will permit prompt opening of the cover and removal of the rod.

STATEMENT OF INDUSTRIAL APPLICATION

In view of the foregoing it will be appreciated that the fishing rod holder 1 may be employed to hold a fishing rod during fishing. The fishing rod also may be used for similar purposes in other environments, for example to hold an elongate member even when tilting force is applied to one end of the member while still permitting relatively facile intentional removal of the member from the holder.

We claim:

1. Apparatus for supporting a fishing rod, comprising receptacle and cover members pivotably connected to each other and movable about a pivot axis between open and closed positions, the two members when in an open relation being adapted to receive a portion of a fishing rod therebetween, the two members when in a closed relation cooperating to define a housing circumscribing at least part of the contained portion of a fishing rod while supporting the fishing rod in a rest position with the axis thereof generally parallel to such pivot axis, and the two members being cooperative to engage with a part of the fishing rod to resist pivoting movement toward an open position in response to forces in the fishing rod tending to tilt the same on an angle with respect to such pivot axis, and opening means responsive to force applied by such fishing rod to said cover member in a direction generally perpendicular to such pivot axis to open the members to permit removing such fishing rod, mounting means for mounting said receptacle and cover members for use to hold a fishing rod, a tab member protruding from a bottom portion of said receptacle member, said tab portion having an enlarged head and a relatively narrow neck, and slide lock means for selectively sliding between an open position to permit removal of said receptacle and cover members from said mounting means and a locked position to lock said receptacle and cover members in said mounting means, said slide lock means having a pair of openings and a narrow portion therebetween, one of said openings being large enough to pass said enlarged head therethrough and the other being relatively smaller to accommodate said neck but to prevent passage of said head therethrough, said mounting means comprising base means for substantially fixedly mounting of the same on a surface and an opening on the top of said base means to receive therein a portion of said receptacle member securely to hold the same therein, said opening in said base means including a plurality of flat surfaces, and said inserted portion of said receptacle member also including a plurality of flat surfaces for engaging those of said base means, said flat surfaces being cooperative securely to hold said receptacle member and base means in relatively fixed positions with respect to each other, said portion of said receptacle member having a prescribed number of flat surfaces, and said opening in said base means having a relatively reduced number of flat surfaces and a plurality of curved surfaces between at least one pair of said relatively adjacent flat surfaces thereof.

2. The invention of claim 1, further comprising shim base means for orienting said base means at an angle with respect to a support surface.

3. The invention of claim 1, said cover members having a pair of cam arms positioned for orientation in under-past-center location with respect to a fishing rod held in the apparatus, at least one of said cam arms being cooperable with respect to such a fishing rod to engage such fishing rod during downward movement thereof while force by said fishing rod also is applied to another portion of said cover member tending to try to open the same, whereby that cam arm being engaged by the downwardly forced fishing rod holds holds closed said cover member from opening.

4. The invention of claim 1, wherein said receptacle and cover members are formed of plastic molded in a plastic injection molding machine.

5. Apparatus for supporting a fishing rod, comprising receptacle and cover members pivotably connected to each other and movable about a pivot axis between open and closed positions, the two members when in an open relation being adapted to receive a portion of a fishing rod therebetween, the two members when in a closed relation cooperating to define a housing circumscribing at least part of the contained portion of a fishing rod while supporting the fishing rod in a rest position with the axis thereof generally parallel to such pivot axis, and the two members being cooperative to engage with a part of the fishing rod to resist pivoting movement toward an open position in response to forces in the fishing rod tending to tilt the same on an angle with respect to such pivot axis, opening means responsive to force applied by such fishing rod to said cover member in a direction generally perpendicular to such pivot axis to open the members to permit removing such fishing rod, and mounting means including base means for substantially fixedly mounting of the same on a surface and an opening on the top of said base means to receive therein a portion of said receptacle member securely to hold the same therein, said opening in said base means including a plurality of flat surfaces, and said inserted portion of said receptacle member also including a plurality of flat surfaces for engaging those of said base means, said flat surfaces being cooperative securely to hold said receptacle member and base means in relatively fixed positions with respect to each other at any one of plural relatively rotated positions, said portion of said receptacle member having a prescribed number of flat surfaces, and said opening in said base means having a relatively reduced number of flat surfaces and a plurality of curved surfaces between at least one pair of said relatively adjacent flat surfaces thereof.

6. The invention of claim 5, comprising a tab member protruding downwardly from the inserted portion of said receptacle member, said tab member having an enlarged head and a relatively narrow neck, and slide lock means subjacent the opening in said base means for selectively sliding between an open position to permit removal of said inserted portion from said base means and a locked position to lock said inserted portion in said base means, said slide lock means having an aperture for receiving said tab member, said aperture having one portion large enough to pass said enlarged head therethrough and another portion relatively smaller to accommodate said neck but prevent passage of said head therethrough.

7. The invention of claim 5, further comprising shim base means for orienting said base means at an angle with respect to a support surface.

8. The invention of claim 5, said cover member having a pair of cam arms positioned for orientation in under-past-center location with respect to a fishing rod held in the apparatus, at least one of said cam arms being cooperable with respect to such a fishing rod to engage such fishing rod during downward movement thereof while force by said fishing rod also is applied to another portion of said cover member tending to try to open the same, whereby that cam arm being engaged by the downwardly forced fishing rod holds holds closed said cover member from opening.

9. The invention of claim 5, wherein said receptacle and cover members are formed of plastic molded in a plastic injection molding machine.

10. The invention of claim 5, said cover member having a pair of slots formed in opposite end walls thereof, and the walls at the end of one of the slot sides being sloped to guide removal direction of a fishing rod therefrom.

* * * * *